Oct. 27, 1953

H. V. HANSEN ET AL 2,656,801

TRACTOR BORNE PLANTER ATTACHMENT

Filed Aug. 5, 1947

INVENTOR.
HAROLD V. HANSEN
JOHN T. MURPHY
BY
Carlson, Pitzner, Hubbard & Wolfe

ATTORNEYS

Oct. 27, 1953　　H. V. HANSEN ET AL　　2,656,801
TRACTOR BORNE PLANTER ATTACHMENT
Filed Aug. 5, 1947　　　　　　　　　　　　　　7 Sheets-Sheet 2

INVENTORS
HAROLD V. HANSEN
JOHN T. MURPHY
BY
Carlson, Pitzner, Hubbard, & Wolfe
ATTORNEYS Oct. 27, 1953 H. V. HANSEN ET AL 2,656,801
TRACTOR BORNE PLANTER ATTACHMENT
Filed Aug. 5, 1947 7 Sheets-Sheet 3

INVENTORS
HAROLD V. HANSEN
JOHN T. MURPHY
BY
Carlson, Pitzner, Hubbard, & Wolfe
ATTORNEYS Oct. 27, 1953 H. V. HANSEN ET AL 2,656,801
TRACTOR BORNE PLANTER ATTACHMENT
Filed Aug. 5, 1947 7 Sheets-Sheet 4

INVENTORS
HAROLD V. HANSEN
JOHN T. MURPHY
BY
Carlson, Pitzner, Hubbard & Wolfe
ATTORNEYS Oct. 27, 1953 H. V. HANSEN ET AL 2,656,801
TRACTOR BORNE PLANTER ATTACHMENT
Filed Aug. 5, 1947 7 Sheets-Sheet 5

INVENTORS
HAROLD V. HANSEN
JOHN T. MURPHY
BY
Carlson, Pitzner, Hubbard & Wolfe
ATTORNEYS Oct. 27, 1953

H. V. HANSEN ET AL

2,656,801

TRACTOR BORNE PLANTER ATTACHMENT

Filed Aug. 5, 1947

INVENTORS
HAROLD V. HANSEN
JOHN T. MURPHY
BY
Carlson, Pitzner, Hubbard & Wolfe
ATTORNEYS

Patented Oct. 27, 1953

2,656,801

UNITED STATES PATENT OFFICE 2,656,801

TRACTOR BORNE PLANTER ATTACHMENT

Harold V. Hansen, Winnebago, Ill., and John T. Murphy, Haywood County, Tenn., assignors to Harry Ferguson, Inc., Detroit, Mich., a corporation of Delaware Application August 5, 1947, Serial No. 766,330

1 Claim. (Cl. 111—59)

The present invention pertains to tractor borne planters.

One general aim of the invention is to provide such a planter embodying a basic or keystone structure, so to speak, to which may be applied a variety of interchangeable instrumentalities to accommodate it for widely divergent types of planting.

More particularly, as the design of agricultural machinery has progressed, a larger and larger number of different forms of planters have been evolved. Variance in soil conditions, land contour, and crop requirements as to depth as well as shape of the ridge or furrow in which the seed is planted have all played a part in multiplying these forms of planters. Such multiplication of specialized implements has unfortunately, however, increased implement costs for the farmer.

One of the aims of the present invention has been to overcome that difficulty by providing a single basic structure which can, with a minimum of attachments, be converted to any one of a wide variety of specialized forms of planter. The farmer has in such case essentially but one planter to buy and maintain, while the manufacturer can realize the benefits of large scale production of but a single standardized unit.

To such end it has been one of the objectives of this invention to embody the main and subframing of a planter employing any desired number of seeders, a selected number of the seeders themselves, a common drive mechanism for such seeders, and press wheels for the same, all in one basic structure. Such basic structure is arranged for the ready application of any one of a series of suitable openers and coverers, running the gamut from heavy soil lister planting to shallow flat land planting. Moreover, the common drive mechanism is so constructed that it may be driven either from ground wheel or tractor, as desired, or as dictated by particular field conditions. Complete freedom of choice is thus afforded of the number of seeders to be used (within reasonable limits) of the type of drive, and of the style of planting—and all with what is essentially but one implement.

In a considerably different aspect, and in a broad sense quite aside from the conversion aspects outlined above, it has also been an objective to devise a planter capable of coaction with an automatic draft control hitch on a tractor. That is to say, we have provided a planter arranged to actuate the automatic depth control of a tractor, such as one equipped with the well known hydraulic power lift disclosed in Henry George Ferguson Patent No. 2,118,180 issued May 24, 1938, in a manner to accomplish planting at uniform, accurately controlled depth. At the same time we have succeeded in overcoming the difficulties of proper pressing of the planted row despite the bodily raising and lowering of the implement entailed in such a type of control. Moreover, those objectives last mentioned, have been attained in a convertible implement of the style first outlined.

The invention also resides in various novel combinations and subcombinations or elements employed in various aspects of the implement, as for example, in the ground wheel drive setup, the alternatively available drive from the drive directly from the tractor with automatic disablement of the same as an incident to raising of the hitch linkage into transport position, and so on.

Further objects and advantages of the invention will become apparent as the following description proceeds taken in connection with the accompanying drawings, in which.

Although certain particular embodiments of the invention have been shown and described here in some detail, there is no intention to thereby limit the invention to the specific details illustrated. On the contrary, the intention is to cover all alternatives and modifications falling within the spirit and scope of the invention as expressed in the appended claim.

Referring more particularly to the drawings, it will be observed that various alterations or modifications in the exemplary implement have been illustrated to accommodate different soil conditions, and to some degree operating preference. Thus, a variety of furrow opening devices have been illustrated accommodating the implement for heavy soil, loose soil, flat land, etc. Moreover, optionally available arrangements for driving the planter either by means of a ground wheel or by power derived more directly from the tractor have been shown. Throughout all of these variants, however, the same basic implement structure is employed. Accordingly, the basic structure common to all of the various modifications or illustrated embodiments will be described. Thereafter will be considered the various illustrated forms of openers, coverers and drives that may be utilized in conjunction with this basic structure.

Illustrated tractor

The planter or implement herein disclosed is intended primarily for use on a tractor equipped with a power elevatable hitch having a stress responsive automatic control device. In brief, the present planter is such that it will serve to apply to that control device a stress proportional to the ground reaction on the implement, thereby effecting an automatic bodily raising or lowering of the implement to retain the ground reaction or draft load substantially constant with a resultant uniformity of planting depth. In the common parlance of people in this field, the implement here contemplated operates "on the system" as distinguished from a so-called "drawbar type" of planter which is simply pulled along behind the tractor. On the other hand, the present implement also is designed to accomplish a uniform coverage and pressing of the planted row despite the bodily raising and lowering of the implement necessarily entailed in such an automatic control of the same as that outlined above.

Figure 2:
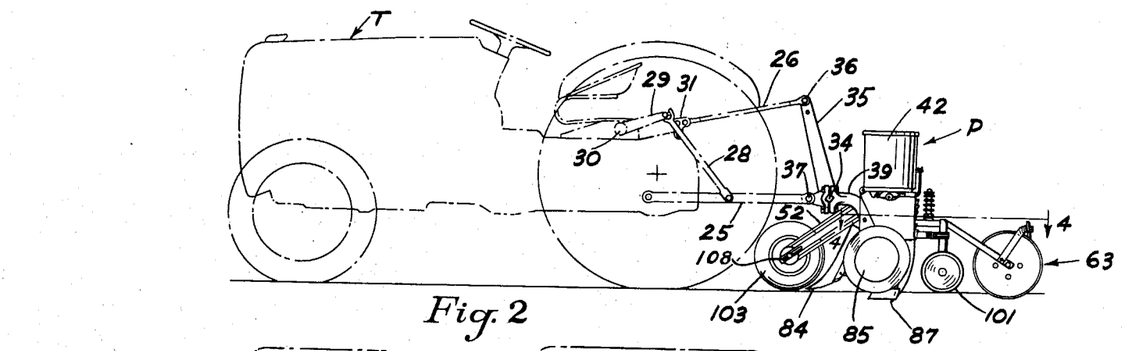
Fig. 2 is a side elevation of the planter of Fig. 1 equipped for heavy duty lister planting and shown as attached to the power operated hitch linkage of a suitable tractor diagrammed in broken lines.
Figure 3:
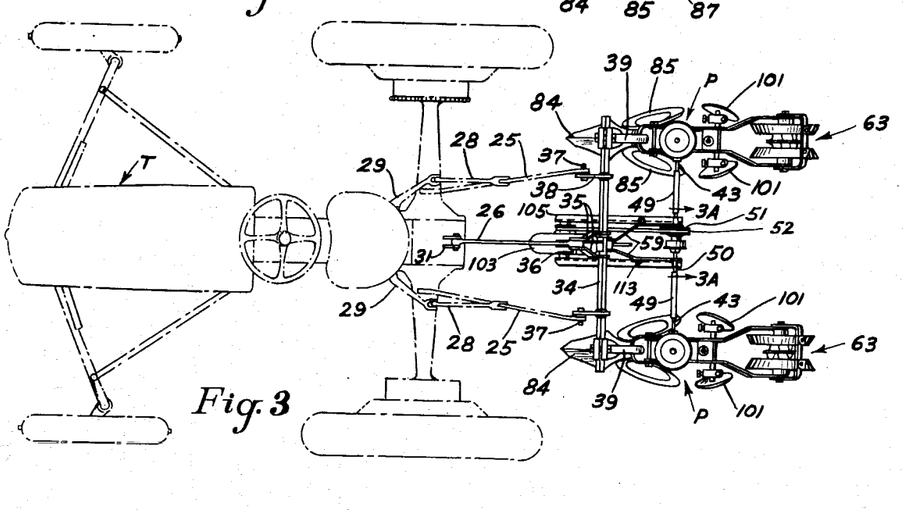
Fig. 3 is a plan view of the apparatus of Fig. 2.

A suitably equipped tractor for manipulating the disclosed implement is indicated generally as T in Figs. 2 and 3. Such tractor will readily be recognized by those skilled in the art as equipped with the well known Ferguson power operated, automatic draft linkage. For further detail of such linkage and its hydraulic operating unit reference may be made to Henry George Ferguson Patent No. 2,118,180 cited earlier herein. For the present suffice it to note that the hitch includes a laterally spaced pair of lower or tension links 25 and an upper or compression link 26. The lower links 25 are pivoted by ball and socket joints at 27 on the rear end portion of the tractor for vertical swing and lateral movement as well. Such pivot points are located below and slightly forward of the center line of the axle for the tractor's rear traction wheels. These lower draft links 25 are suspended by pivoted drop links 28 from a pair of vertically swinging crank arms 29 rigid with a transverse shaft 30. The latter shaft is rocked by a suitable hydraulic power unit (not shown) for raising and lowering the links 25.

Figure 11:
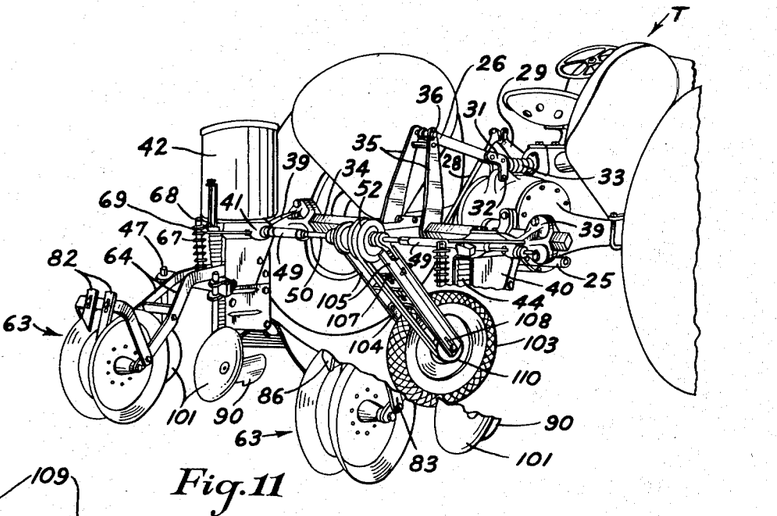
Fig. 11 is a rear perspective view of the implement attached to the rear end of a tractor, a portion of the apparatus being broken away to show more clearly the ground wheel drive, and the units being of the particular form shown in Fig. 5.

The upper draft link 26, normally operated in compression, is pivotally connected at its forward end to a shackle 31 of bell crank shape pivoted at 32 on the upper rear side of the tractor's differential housing to rock fore and aft. Forward rocking of this shackle is resisted by a compression spring 33 (Fig. 11). Pressure applied through the top link 26, and overcoming the resistance of the spring 33, automatically operates a control valve (not shown) for the hydraulic unit mentioned above to cause a raising of the lower draft links 25. Similarly, diminution in top link compression below a predetermined value effects a corresponding lowering of the lower draft links 25. As is well understood, bodily raising and lowering of an implement attached to the draft links in such system is thus accomplished automatically in accordance with changes in compression on the top link 26 (see Patent No. 2,118,180 mentioned above). The usual manual control lever (not shown) for the Ferguson hydraulic setup is also provided and is operable at will in the usual manner for such system to cause the hydraulic unit to pull the draft linkage up to full elevation for transport of the implement free of the ground.

Basic structure of implement

Figure 1:
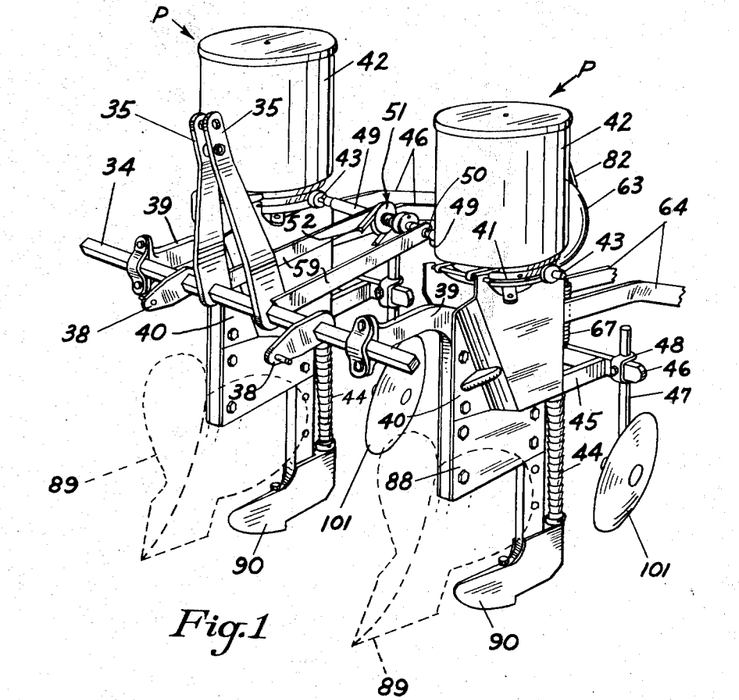
Figure 1 is a partial perspective view, taken from the front end, of a planter embodying the broader aspects of the present invention, the basic structure being shown in full lines and the openers and coverers, which may take a variety of forms some of which are later illustrated herein, being indicated merely generally in broken lines.

Turning now to the basic structure of the implement applied to such hitch linkage, it will be observed upon reference to Fig. 1 that the planter there shown has a main frame of inverted T-shape. Such main frame is constituted by a transverse tool bar 34 of diamond shaped cross section with which is rigid a generally upright standard comprised of a pair of laterally spaced bars 35, 35. A removable pivot pin 36 (Figs. 2 and 3) detachably connects the upper end of this standard to the trailing end of the top link 26, such pin being received in the usual socketed ball in the end of such link which is located between the converging upper ends of the bars 35.

Likewise detachable connection of the tool bar 34 to the trailing ends of the lower draft links 25 is accomplished by removable pins 37 (Figs. 2 and 3). Such pins are inserted in socketed balls in the trailing ends of these links and through holes in the forward ends of short, forwardly projecting brackets 38 rigid with the tool bar. The standard 35, 35 is canted slightly forward so that the three points of pivotal connection of the main implement frame to the hitch links are arranged substantially in a common vertical plane (Fig. 2). To attach or detach the implement it is necessary merely to insert or remove the three pivot pins at the trailing ends of the respective hitch links.

As will appear later in greater detail, the ground engaging portions of the implement, and particularly the furrow opening and coverers are disposed below the lines of the lower draft links 25 and in a manner such that ground reaction on such instrumentalities will tend to rock the tool bar 34 forwardly about the pivots 37, in effect tending to rotate the tool bar forwardly about its longitudinal axis. As a result the upright standard 35, 35 tends to rock forward, thereby serving as a means of applying compressive load to the stress responsive control device (33) on the tractor through the top link 26 in accordance with ground reaction on the implement.

To the transverse tool bar 34 may be attached any desired number of planter units P. Two such units are arranged side by side in Fig. 1 simply by way of illustration. These units are identical and accordingly a description of one will suffice for both. Each such unit includes a heavy gooseneck or frame member 39 rigidly, although detachably, clamped to the tool bar 34. This gooseneck extends rearwardly and downwardly from the tool bar and to its lower end is attached a suitable "furrow opener," various exemplary forms of which are later described herein.

Figures 4, 5:
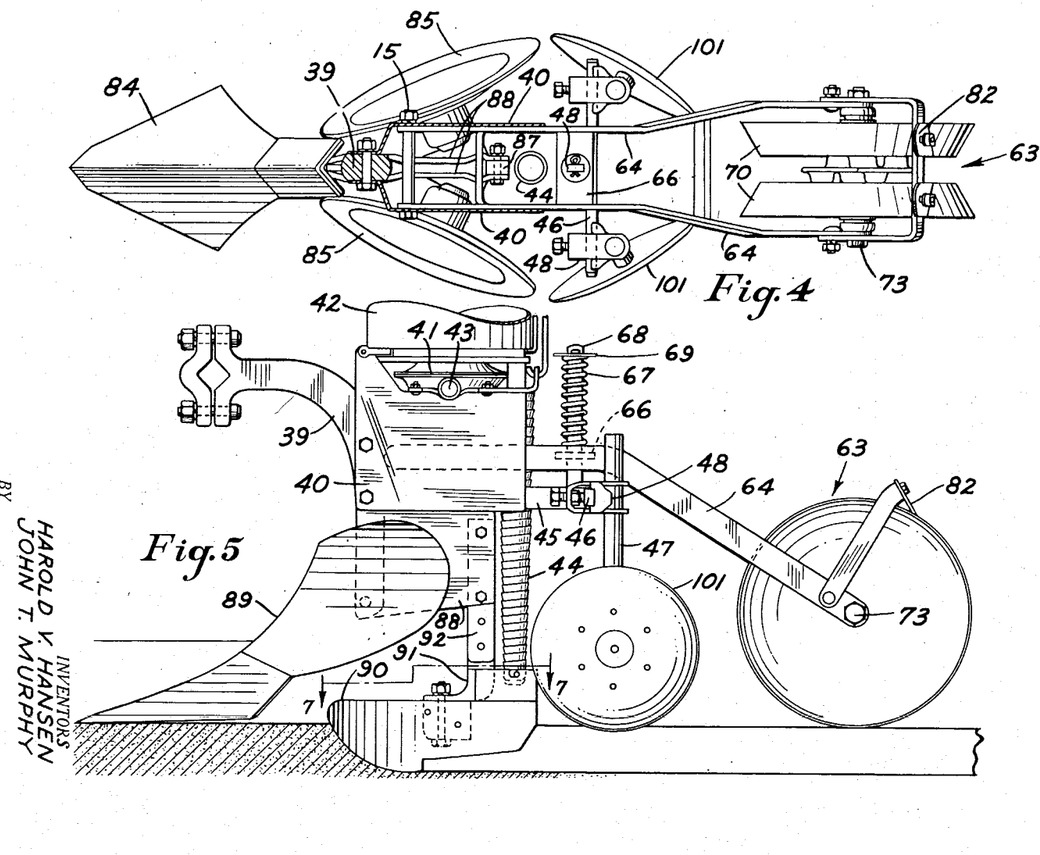
Fig. 4 is an enlarged horizontal sectional view taken substantially along the line 4—4 in Fig. 2 through one of the units of the implement there shown.
Fig. 5 is a side elevation, on the same scale as Fig. 4, of the planter unit there appearing, but with the upper portion of the seed hopper being broken away and a modified form of furrow opener substituted for that of the units of Figs. 2 to 4.

Bolted to the intermediate or shank portion of the gooseneck 39 is a pair of rearwardly extending plates 40, 40 (Fig. 4). The portions of these plates trailing behind the gooseneck are disposed in parallel spaced relation to form supporting wings constituting a supporting frame for a suitable seed dispenser 41 surmounted by a seed hopper 42 (Figs. 1 and 2). A seed dispenser of the form disclosed in Harold V. Hansen application Serial No. 643,628 filed January 26, 1946, is preferred. Any one of a large variety of well known seed dispensers will serve the purpose, however, insofar as the present invention is concerned. Since a variety of seed dispenser mechanisms suitable for the present purpose are well known in the art, further detailing here is unnecessary. It is sufficient to observe that the mechanism may include the usual rotary seed plate (not shown) driven from a laterally projecting stub shaft 43 (Fig. 3) and delivering the seeds from the hopper 42 to a seed tube 44 (Fig. 5) in timed relation with the rotation of the plate.

Also rigid with the gooseneck 39 is a pair of rearwardly extending, laterally spaced bars 45 (Fig. 5) which constitute a coverer support. These bars extend along the inner faces of the lower portions of the wings 40, being bolted to the same and serving to rigidify and reinforce the same. To the trailing ends of these bars 45 is fixed a cross bar 46 to which are adjustably fixed standards 47 by suitable clamps 48. Such clamps may be adjusted in position along the cross bar 46 and the standards 47 slid up or down in their respective clamps. These standards 47 each carries a "coverer" device (Fig. 1), various suitable forms of which are illustrated and later described herein.

Provision is made for coupling the stub shafts 43 of the several seed dispensers 41 that may be used, in order to actuate them in unison from a single power source. For that purpose the stub shafts 43 are disposed in axial alinement (Figs. 1 and 3), being coupled by tubular shafts 49, telescoped over their ends and over the ends of a centrally located shaft 50 of square cross section (see Figs. 3 and 3A). On this shaft 50 is located an adjustable diameter drive pulley, designated generally as 51, and over which is trained an endless V-belt 52. The pulley 51 may be adjusted in fixed increments to accommodate precise selection of the feed speeds desired for the seed dispensers.

Figure 3A:
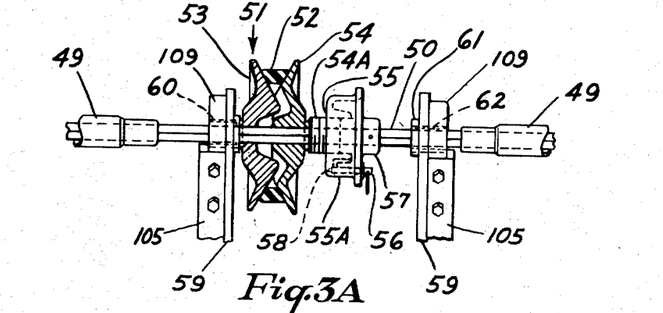
Fig. 3A is an enlarged detail sectional view taken through the adjustable diameter drive pulley substantially along the line 3A—3A in Fig. 3.

As indicated in Fig. 3A, the pulley 51 comprises a coacting pair of frusto-conical sections 53, 54 between which the V-belt 52 is received. The hub of the section 53 is pinned to the shaft 50 and by shifting the other section 54 toward and from such fixed section 53 the effective diameter of the pulley is correspondingly adjusted. Such shift of the section 54 is accomplished by threading its hub portion 54a within a nut 55 and which in turn has a cup shaped flange 55a which is connected by a spring urged detent 56 with a member 57 pinned to the shaft 50. By releasing the detent 56 and turning the nut 55, the pulley section 54 is shifted axially and is locked in a selected position of adjustment by dropping the detent into one of a circularly disposed series of holes 58 in the flange 55a.

The shaft 50 is supported from the tool bar 34 by a pair of bracket arms 59 (Figs. 1 and 3) converging forwardly and rigidly clamped to the tool bar at their forward ends. The hub of the pulley section 53 is journaled in a suitable bearing 60 on the rear end of one of the bracket arms, while a bushing 61 fixed to the shaft 50 is journaled in a bearing 62 at the trailing end of the other bracket arm (Fig. 3A).

All of the structure of the planter units P so far described is movable bodily, as a unitary structure, with the transverse tool bar 34. Thus bodily raising and lowering of this entire structure, including the main supporting framework, furrow opening and covering devices, seed dispensers and their basic drive mechanism is accomplished by the automatically controlled hitch linkage. Each of the planter units P is, however, equipped with a press wheel arrangement which is relatively movable with reference to the unitary structure noted, in a vertical direction, so that the press wheel may roll properly along the top of the closed furrow or planted ridge, pressing firmly down upon it at all times without regard to the bodily lifting and lowering of the remainder of the implement incident to the automatic draft control.

In the illustrated arrangement a press wheel, designated generally as 63, is provided for each planter unit P (Figs. 1 to 5). Such press wheels are journaled in the rear portions of a frame constituted by laterally spaced bars 64 (Fig. 4). The forward ends of such bars are pivoted to swing vertically on a transverse pin 65 extending between the wings 40. The intermediate portions of the side bars of the press wheel frame are joined by a transverse strut 66. A helical compression spring 67 (Fig. 5) yieldably urges the press frame downward. Such spring is slidably guided on a pin 68 rigidly supported on the rear portion of the coverer frame 45, 45 and rising through an aperture in the strut 66, the spring being interposed between the strut and a suitable washer 69 fixed to the upper end of the pin.

Figure 13:
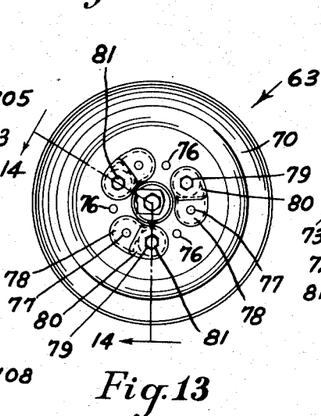
Fig. 13 is an enlarged face view of one of the press wheels included in the implements of Figs. 2 and 11.
Figure 14:
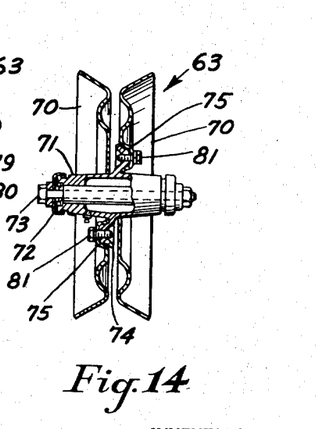
Fig. 14 is a sectional view through the press wheel, being taken substantially along the line 14—14 in Fig. 13.

The particular press wheel 63 illustrated herein (see Figs. 13 and 14 for detail) is of a plural section type of adjustable tread width to accommodate different widths of planted ridge. Thus it is shown as comprising two pressed, sheet metal sections 70, 70 having outwardly extending frusto-conical peripheral flanges for properly shaping the soil into a ridge as it is pressed down by the wheel. These disk sections are slidably received on a central hub or sleeve 71 journaled at its opposite ends by suitable antifriction bearings 72 on pins 73 carried by the side bars 64 of the press wheel frame. An integral circular web 74 on the hub 71 has three equidistantly spaced, laterally projecting bosses 75 on each of its side faces. Each of the wheel sections 70 may be secured to its corresponding set of bosses 75 in any one of three different positions of angular adjustment about its axis, there being a corresponding different axial displacement of the disk in each case. Thus each disk has in it one set of three holes 76 fashioned in the flat web portion of the disk, a second set 77 fashioned in embossments 78 and a third set 79 fashioned in still deeper embossments 80. The selected one of the three sets of holes 76, 77, 79 is registered with the tapped holes in the bosses 75 and screws 81 threaded in to hold the disk in place. A large variety of tread widths is thus afforded.

Suitable scraper blades 82 (Fig. 11) are adjustably fixed to a U-shaped supporting bracket 83 arched across the press wheel and secured to the frame 64, 64.

A basic implement structure is thus afforded which is adapted for coaction with an automatic control on the tractor as described and which can moreover be utilized in setting up a planter for any one of a great number of specialized planting operations. For the latter purpose selection is made of an appropriate opener, coverer, if any, for coaction therewith and a drive suitable for rotating the pulley 51. Irrespective of the selection made in those three elements, however, the basic implement structure requires no alteration. The exemplary form of openers, coverers and drive connections herein shown are next described.

*Opener devices*

The basic implement structure described above may, as illustrated, be equipped with any one of a variety of furrow opener devices, the choice depending largely upon the particular soil conditions encountered.

For deep planting in heavy soil the opener arrangement of Figs. 2 to 4 is suitable. As there shown each planter unit P includes a lister bottom 84 which, instead of the usual side wings, has a pair of coacting disks 85. These disks face outward and are angled to throw the soil outward after it is dislodged by the lister bottom 84 which leads them.

Each lister bottom 84 is bolted to the lower end portion of the gooseneck 39 of its planter unit. The coacting wing disks 85 are journaled in bracket arms 86 (Fig. 4) rigid with the lister bottom and extending rearwardly from it in diverging relation to each other.

The furrow opening arrangement of Figs. 2 to 4 also includes a subsoiler point 87 arranged immediately ahead of the lower or discharge end of the seed tube 44. The shank of this subsoiler 87 is bolted between the pair of supporting plates 88 (Fig. 4) extending rearwardly from the lower portion of the gooseneck 39 and rigid with the latter. Suitable straps (not shown) may be provided to secure the lower portion of the seed tube to the subsoiler.

Figures 7, 8, 10:
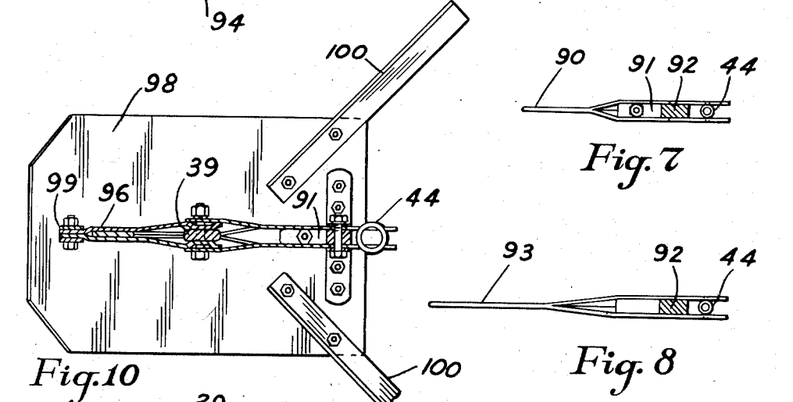
Fig. 7 is a detail sectional view taken substantially along the line 7—7 in Fig. 5.
Fig. 8 is a detail sectional view taken substantially along the line 8—8 in Fig. 6.
Fig. 10 is a sectional view taken substantially along the line 10—10 in Fig. 9.

In Figs. 5 and 7 is shown one of the planter units equipped with a somewhat different style of furrow opening arrangement also suited for heavy soil conditions. In this instance a lister bottom 89 with full stationary side wings is fixed to the lower end of the gooseneck 39 as contrasted with the disk winged lister of Figs. 2 to 4. Moreover, instead of using a subsoiler point a runner type of opener 90 is utilized.

The runner type opener 90 is of generally familiar form, comprising rearwardly diverging wide wings (Fig. 7) between the trailing portions of which the lower end of the seed tube 44 is fixed (Fig. 5) for dropping the seed into the furrow opened by the runner. Such runner is detachably bolted to a foot 91 on the lower end of a supporting bar 92 fixed between the plates 88.

Figure 6:
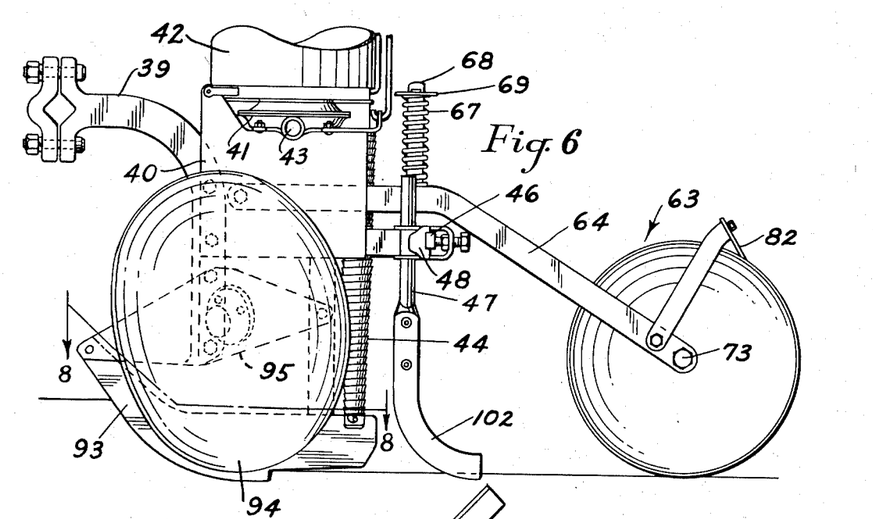
Fig. 6 is a side elevation similar to Fig. 5, but showing the planter unit equipped with still another modified form of furrow opener particularly adapted for use in loose soil.

In Figs. 6 and 8 one of the implement units is shown equipped for loose soil lister planting. In such case the furrow is opened by a runner 93 coacting with a pair of opener disks 94. The runner 93 is comprised of a pair of rearwardly diverging wings (Fig. 8) joined in their forward portions to present a steeply upswept curving edge (Fig. 6) which slices into the soil. The lower end of the seed tube is fixed between the trailing ends of such wings. The runner 93 is fixed to the lower portion of the gooseneck 39 as are brackets 95 carrying the opener disks 94 in outwardly facing, suitably angled position at each side of the runner.

Figure 9:
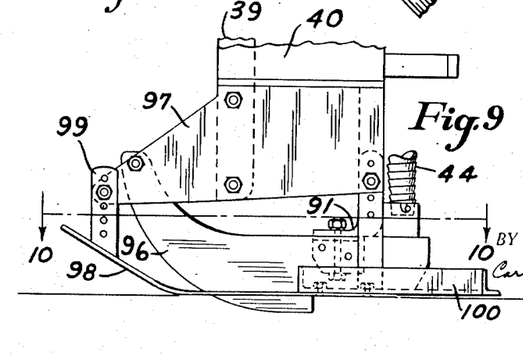
Fig. 9 is a side elevation of still another modified form of furrow opening mechanism that may be used in the planter unit, in this instance the apparatus being particularly adapted for use in so-called flat land planting.

For flat land planting still another opener arrangement such as that of Figs. 9 and 10 may be employed. In such planting the seeds are barely covered by the soil, being planted on level ground as distinguished from planting in a furrow or on a ridge. In this case the opener device includes a runner 96 generally similar to the runners 90 and 93 previously described and fixed to the foot 91 on the lower end of the arm 92 heretofore noted. A forwardly projecting pair of bracket plates 97 bolted to the lower end of the gooseneck 39 carry a skid or sled 98. This skid comprises a generally rectangular flat plate, upturned at its forward portion sled-fashion and having a suitably apertured lug 99 on it for adjustable attachment to the bracket plates 97. Projecting from the rear portions of the skid 98 are wing scrapers in the form of angle irons 100, projecting outward and rearward from the skid (Fig. 10).

*Coverers*

Various forms of coverers may be used in the illustrated implement. Simply by way of example several forms have been shown. The choice is goverened by the soil conditions, the form of seed bed desired and to some degree by the character of the coacting opener device.

In Figs. 2 to 4 the coverer comprises a pair of inwardly facing disks 101, angled inwardly toward each other at their rear edges so as to throw the soil inward over the seed. These disks are journaled on the lower ends of the upright standards 47 adjustably secured to the cross bar 46 as previously described.

An identical pair of coverer disks 101 is employed in the setup of Figs. 5 and 7.

In the arrangement of Figs. 6 and 8 the coverer comprises a pair of similar shaped scraper blades 102 arranged to scrape the soil inward over the seed. These blades have shanks received by the clamps 48 on the cross bar 46.

In the setup of Figs. 9 and 10 for flat land planting it is ordinarily not necessary to use any coverer device at all, the seed planting being very shallow and the disturbed soil rolling in on the seed sufficiently to accomplish any covering that may be required.

*Ground wheel drive*

Figure 12:
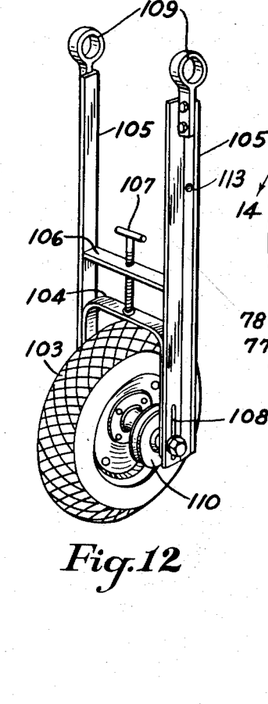
Fig. 12 is an enlarged detail perspective view of the ground wheel and its supporting frame included in the implements of Figs. 2 and 11.

In the setups of Figs. 2 to 11 inclusive the seed dispensers 41 are driven from a ground wheel. For that purpose a pneumatic tired ground wheel 103 (Figs. 11 and 12) is preferably used, the same being journaled in the lower end of a U-shaped subframe 104 (Fig. 12). This subframe is slidably received between the lower ends of a pair of bars 105 constituting the main ground wheel frame. A transverse strut 106 joins these side bars and has threaded in it an adjusting screw 107 by means of which the subframe 104 and wheel 103 may be shifted longitudinally of the main ground wheel frame. Slots 108 in the side bars of the main ground wheel frame receive the ends of the shaft for the ground wheel, thus permitting such adjustment.

The upper ends of the side bars 105 of the ground wheel frame are apertured at 109 (Fig. 12), for reception of the hubs on the variable diameter pulley assembly previously identified (Figs. 3A and 11). The drive belt 52 leading to this adjustable diameter pulley is trained over a drive pulley 110 fixed to the shaft of the ground wheel 103 and driven by the latter (Figs. 11 and 12).

The side bars 105, 105 of the ground wheel frame are positioned to angle downwardly and forwardly from the seeder drive shaft, either gravity or an appropriate loading means being utilized to urge the ground wheel yieldably downward during operation. If desired, such loading means may take the form of suitable springs and rods and such rods may pass through apertures 113 in the side bars of the ground wheel frame (Fig. 12).

By thus locating the ground wheel forwardly of the implement and spring urging it downward, it is, in effect, pushed into the ground as the implement advances. In that way firm contact of the ground wheel 103 with the soil is assured at all times throughout the operation of the implement. In consequence irregularities in seed spacing due to skipping or skidding of the ground wheel is minimized. Since the ground wheel revolves at a speed directly proportional to the speed of tractor travel the spacing between seeds is maintained substantially constant.

Tensioning of the drive belt 52 is adjusted by turning the hand screw 107 (Fig. 12) to shift the ground wheel 103 and its attached pulley 110 bodily toward or away from the coacting adjustable diameter pulley 51. No change in belt tension results with rise and fall of the implement since the ground wheel frame is pivoted about the axis of the shaft 50.

When the hitch links 25 are raised to hoist the implement into transport position the ground wheel frame tends to swing downward. Such swing is, however, limited by appropriate stops so that the ground wheel is raised free of the ground, along with the rest of the implement, for transport.

*Drive from tractor*

An arrangement is illustrated in Figs. 15 to 20 by means of which the implement can, if desired, be driven by power derived directly from the tractor rather than by way of a ground wheel as previously described. For such purpose a suitable drive sprocket 114 (Fig. 15) may be applied to the rear axle of the tractor, an endless roller chain 115 being trained over this sprocket as well as over a driven sprocket 116 on a countershaft 117. In such setup the belt 52 trained over the variable diameter pulley 51 is driven from a pulley 118 on the countershaft rather than from a ground wheel pulley as in the previously described arrangement.

In the installation shown in Figs. 15 to 20 provision is, moreover, made for disabling the drive to the planter whenever the tractor is backed, for also disabling the drive automatically whenever the implement is hoisted into transport position, and for driving from the countershaft 117 a suitable fertilizer dispenser (not shown), if one is desired. For the latter purpose an additional belt pulley 119 is applied to the countershaft. Upon reference to Fig. 19 it will be seen that the countershaft 117 is square in cross section and that each of the belt pulleys 118, 119 includes a respective outer frusto-conical section 118A, 119A fixed to such shaft as well as a corresponding axially slidable section 118B and 119B. Compression springs 120 interposed between collars 121 fixed to the countershaft and respective ones of the slidable pulley sections 118B, 119B urge the latter yieldably toward the coacting fixed pulley sections.

Figures 15, 16, 17, 18:
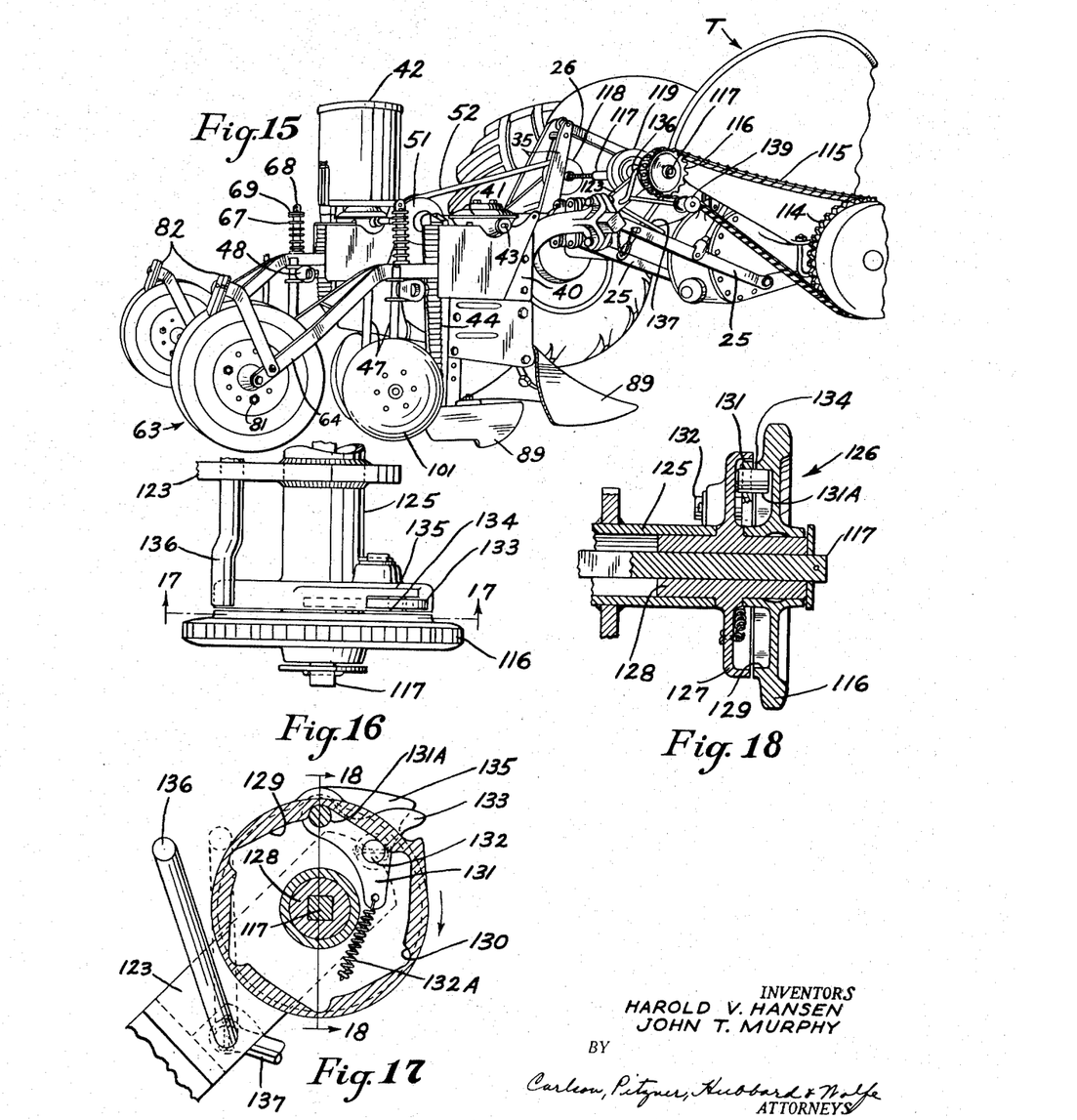
Fig. 15 is a general perspective view of another form of planter implement embodying the invention and which in this instance is equipped for drive from the rear axle of the tractor to which the implement is shown applied, rather than from a ground wheel as in Figs. 2 and 11.
Fig. 16 is an enlarged fragmentary plan view of a clutch mechanism included in the drive of the implement of Fig. 15.
Fig. 17 is a sectional view taken substantially along the line 17—17 in Fig. 16.
Fig. 18 is a sectional view taken substantially along the line 18—18 in Fig. 17.
Figure 19:
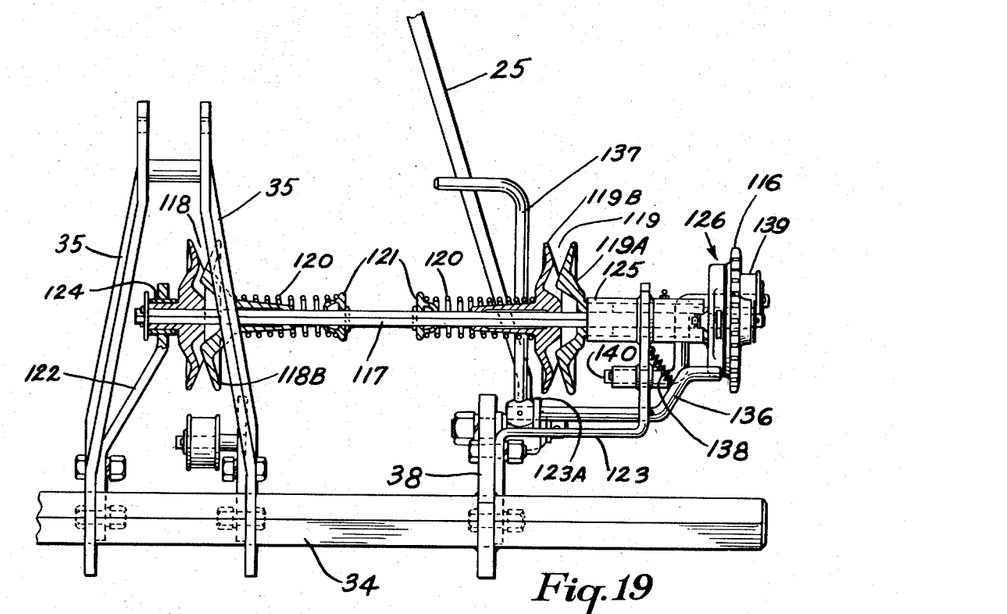
Fig. 19 is a fragmentary plan view of the countershaft and associated mechanism included in the implement of Fig. 15.

As to the mounting of the countershaft 117, it will be observed upon reference to Figs. 15 and 19 that a pair of upwardly and forwardly extending brackets 122, 123 are provided for the purpose. The left end of the countershaft is journaled by means of a bushing 124 in the upper end of the bracket 122 and in which is rotatably received the hub portion of the pulley section 118A. The lower end of this bracket is bolted to one of the upright main frame bars 35. The other bracket 123 (Fig. 19) is bolted to an adjacent one of the forwardly projecting bracket arms 38 on the tool bar 34; such bracket 123 being shaped to provide a lateral offset and having fixed to its upper end a sleeve 125. The hub portion of the adjacent pulley section 119A extends into this sleeve and is rotatably journaled in it.

At the outer end of the sleeve 125 is located a one way clutch mechanism designated generally as 126, which serves to connect the sprocket 116 to the countershaft 117. By disengaging this clutch, through use of a mechanism about to be described, the drive may be automatically disengaged whenever the planter is raised into transport position and by making it a one way clutch, reverse driving of the planter mechanism is prevented when the tractor is backed. In the present instance the clutch mechanism 126 comprises a cup shaped casting 127 (Fig. 18) rigid with an elongated hub or sleeve 128 having a square aperture to receive the correspondingly shaped countershaft 117 and journaled at its inner end within the supporting sleeve 125. The sprocket 116 is journaled on the outer portion of the hub 128 and has integral with one side face an annulus 129 registering with the open end of the cup 127. The interior of the annulus 129 is shaped as indicated in Fig. 17 to provide a circumferentially spaced series of shoulders or teeth 130 of a one way clutch. A coacting clutch pawl 131 is pivoted intermediate its ends on a pin 132 carried by the cup 127. A pin 131A on the outer end of the pawl is engageable with the teeth 130, a contractile spring 132A serving to urge the pawl yieldably into engaged position.

A disengaging dog 133 on the clutch pawl 131 (Figs. 16 and 17) projects through a slot 134 in the housing cup 127 adjacent a similarly shaped shield or lug 135 rigid with the housing. By swinging the dog 133 to the left (as viewed in Fig. 17) the pawl is swung into disengaged position.

To swing the disengaging dog 133 whenever the implement is hoisted into transport position, the relative movement between the hitch links and implement frame incident to such raising is utilized. For that purpose a rockshaft 136 (Fig. 19) is journaled in the bracket 123 and in a supplemental bracket or lug 123A on the latter. The right hand end of the rockshaft is offset forwardly in a crank shape, being located to swing into and out of position to intercept the dog 133 as the rockshaft is rocked. To the other or left end of the rockshaft 136 is fixed a forwardly projecting arm or lever 137 provided with a laterally turned end portion overlying the adjacent lower draft link 25. A contractile spring 138 connected between the bracket 123 and crank end of the rockshaft urges the latter to turn forward so that the forward end portion of the lever 137 is retained in contact with the draft link 25.

Figure 20:
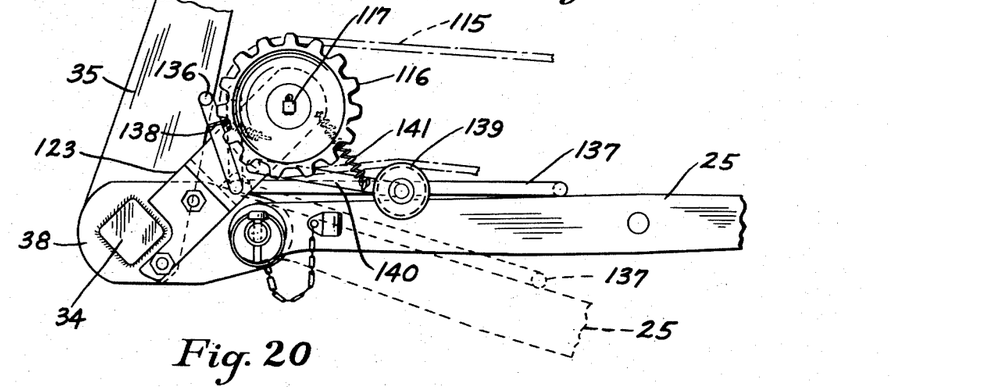
Fig. 20 is a fragmentary end elevation of the clutch and associated mechanism included in the apparatus of Fig. 19.

As the draft link 25 shifts from the full line to the dotted line position of Fig. 20, in raising the implement for transport, the shaft 136 thus rocks forward so that its end portion intercepts the clutch disengaging dog 133. The shield or lug 135 comes to rest in lodgment against the end portion of the rockshaft and with the dog 133 pressed into disengaged position. The clutch is thus automatically disengaged and further rotation of the countershaft 117 positively arrested. Upon lowering of the implement into working position the underriding link 25 forces the lever 137 upward to the full line position of Fig. 20, thereby rocking the end of the rockshaft 136 free of the dog 133 so that spring 132 is free to re-engage the clutch pawl.

While the implement is in lowered working position there is some small rise and fall of the draft links. The resultant swing of the rockshaft 136 is, however, small enough that the dog 133 remains untouched and the clutch engaged. To retain the chain 115 taut despite such movement a spring urged idler 139 (Fig. 15) is employed. This idler is mounted on an arm 140 (Fig. 20) pivoted on the bracket 123, a tension spring 141 serving to swing it upward for engagement of the idler with the chain. The chain is thus retained taut even though the driven sprocket 116 is carried by a support where center of swing is displaced somewhat from the center of the drive sprocket 114.

*Résumé of operation*

The operation of the disclosed planter mechanisms will, in general, be clear from the foregoing. By way of brief recapitulation attention may first be given to the implement of Figs. 2 and 3. In transporting the implement to point of use the operator raises the draft links 25 by means of the hydraulic power unit (not shown) on the tractor to their fully elevated or transport position. The implement is thus lifted bodily and in its entirety free of the ground so that it can be readily transported. The top link 26 coacts with the upright or standard 35, 35 to retain the implement stabilized in a generally upright position. There is some droop of both the press wheel 63 and ground wheel 103. Both are, however, retained free of the ground. Thus the cross bar 46 acts as a stop for the press wheel framing bars 64 to limit downward movement of the same and similarly downward swing of the ground wheel frame bars 105 is limited by engagement of appropriate stops as heretofore described.

On reaching the point of use the operator has only to swing the control lever of the hydraulic unit to permit the draft links 25 and attached implement to descend by gravity. As soon as the implement is grounded the lister bottom 84 or other opening device enters the soil imposing a tension load on the lower draft links 25 and a compression load on the upper draft link 26. As heretofore indicated, variations in the compression load on the top link 26 are utilized to maintain the furrow opening device at a depth for constant draft determined by the control point setting of the manual control lever for the hydraulic unit on the tractor. The ground wheel 103 drives the seed dispensers 41 through the connections heretofore described for feeding the seeds at selected intervals behind the opening device and thereafter they are covered by soil thrown in by the coverer device. The press wheel 63 runs along pressing the earth in over the seeds. The pressure exerted by the press wheel may be altered by changing the compression of the associated compression spring 67. Moreover, the press wheel is free to rise and fall relative to the implement as variations in contour may require and without regard to the automatic variations in implement position incident to maintenance of uniform draft load.

Operation of the implement shown in Fig. 15 is substantially the same as that just described except that drive for the seed dispensers 41 is derived from the tractor rear axle rather than from a ground wheel. In both instances the drive is automatically disabled when the implement is hoisted into transport position, in the one instance by lifting the ground wheel from contact with the ground and in the other by disengagement of the clutch 126.

Attachment or detachment of the implement is a very simple matter, it being but the work of a moment either to insert the pins 36, 37 or remove the same. Preparatory to any planting operation proper opener and coverer instrumentalities are applied to the basic implement structure and similarly a desired type of drive setup is selected.

We claim as our invention a planter mechanism as set forth below, any reference in the following claims to tractors and tractor parts, such as hitch linkages, being made simply in order to indicate clearly and with particularity the elements to which the planter is adapted to be at- tached and its mode of operation when so conditioned for its normal intended use.

We claim as our invention:

A planter attachment having a unitary structure susceptible of being mounted upon a tractor and bodily raised and lowered relative to the ground, said attachment comprising, in combination, a horizontally disposed transverse tool bar having means for connecting the same to a tractor, a pair of transversely spaced trailingly disposed bracket arms having their forward ends rigidly fixed to said tool bar, a dispenser drive shaft disposed transversely of said bracket arms and journaled thereon adjacent the trailing ends thereof, a driven element fixed to said dispenser drive shaft, a pair of planter units mounted on said tool bar in spaced transversely alined relation with said dispenser drive shaft, said shaft being disposed between said units, each said planter unit comprising a gooseneck rigidly clamped to said tool bar and extending rearwardly and downwardly therefrom, a lister bottom fixed to the lower end of said gooseneck, a pair of frame plates secured against the sides of said gooseneck and extending rearwardly therefrom to form a boxlike bracket, a seed dispenser straddling said boxlike bracket and firmly fixed thereon, said seed dispenser having a drive means alined with and connected to said dispenser drive shaft, supporting means fixed to the lower end portion of said gooseneck and extending rearwardly therefrom, a furrow opener fixed to said supporting means in trailing relation to said lister bottom, a seed tube extending downwardly from said seed dispenser between said frame plates and terminating at the trailing end of said furrow opener, a cross bar rigidly fixed to said frame plates and spaced rearwardly therefrom, a pair of furrow closers mounted in depending relation from said cross bar, a press wheel frame having a leading end disposed between said frame plates and pivoted thereto and a trailing end mounting a press wheel, said press wheel frame being disposed above said cross bar, resilient means interconnecting said cross bar and said press wheel frame for application to said press wheel frame of a yieldable downward force toward said cross bar, and means for driving said driven element.

HAROLD V. HANSEN.
JOHN T. MURPHY.

References Cited in the file of this patent

UNITED STATES PATENTS

| Number | Name | Date |
|---|---|---|
| 1,259,826 | Bloom | Mar. 19, 1918 |
| 1,328,375 | Griffice | Jan. 20, 1920 |
| 1,348,130 | Hevel et al. | July 27, 1920 |
| 1,618,329 | Fuquay | Feb. 22, 1927 |
| 2,031,650 | Hendricks et al. | Feb. 25, 1936 |
| 2,063,852 | Ray | Dec. 8, 1936 |
| 2,118,181 | Ferguson | May 24, 1938 |
| 2,253,706 | Hipple | Aug. 26, 1941 |
| 2,263,652 | Silver | Nov. 25, 1941 |
| 2,318,224 | Hyland | May 4, 1943 |
| 2,318,392 | Hipple | May 4, 1943 |
| 2,328,174 | Silver | Aug. 31, 1943 |
| 2,339,689 | Englund | Jan. 18, 1944 |
| 2,347,091 | Elliott | Apr. 18, 1944 |
| 2,356,231 | Ferguson | Aug. 22, 1944 |
| 2,363,749 | Rude | Nov. 28, 1944 |
| 2,416,189 | McIntyre | Feb. 18, 1947 |
| 2,561,614 | Dixon | July 24, 1951 |